(12) United States Patent
Perry

(10) Patent No.: US 9,426,502 B2
(45) Date of Patent: Aug. 23, 2016

(54) REAL-TIME CLOUD-BASED VIDEO WATERMARKING SYSTEMS AND METHODS

(71) Applicant: David Perry, Monarch Beach, CA (US)

(72) Inventor: David Perry, Monarch Beach, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 714 days.

(21) Appl. No.: 13/674,899

(22) Filed: Nov. 12, 2012

(65) Prior Publication Data

US 2013/0120651 A1    May 16, 2013

Related U.S. Application Data

(60) Provisional application No. 61/558,859, filed on Nov. 11, 2011.

(51) Int. Cl.
| | |
|---|---|
| *H04N 7/173* | (2011.01) |
| *H04N 21/235* | (2011.01) |
| *H04N 7/01* | (2006.01) |
| *H04N 21/2343* | (2011.01) |
| *H04N 21/472* | (2011.01) |
| *H04N 21/8358* | (2011.01) |

(52) U.S. Cl.
CPC ............ *H04N 21/2351* (2013.01); *H04N 7/01* (2013.01); *H04N 21/2343* (2013.01); *H04N 21/47202* (2013.01); *H04N 21/8358* (2013.01)

(58) Field of Classification Search
CPC .................. H04N 2005/91335; H04N 19/467; H04N 21/8358
USPC ................................ 725/86, 91, 93
See application file for complete search history.

(56) References Cited

U.S. PATENT DOCUMENTS

| | | | |
|---|---|---|---|
| 5,889,499 A | 3/1999 | Nally et al. ................. 345/7 |
| 6,102,969 A | 8/2000 | Christianson et al. ........ 717/146 |
| 6,241,612 B1 | 6/2001 | Heredia ..................... 463/42 |
| 6,342,892 B1 | 1/2002 | Van Hook et al. ........... 345/503 |
| 7,090,577 B2 | 8/2006 | Serizawa et al. ............. 463/6 |
| 7,096,253 B2 | 8/2006 | Vinson et al. ............... 709/203 |
| 7,227,894 B2 | 6/2007 | Lin et al. ................... 375/240.12 |
| 7,275,987 B2 | 10/2007 | Shimakawa et al. ......... 463/9 |
| 7,448,063 B2 | 11/2008 | Freeman et al. ............. 725/136 |
| 7,804,856 B2 | 9/2010 | Krause et al. ............... 370/486 |
| 7,818,769 B2 | 10/2010 | Peacock et al. ............. 725/54 |
| 7,953,883 B2 | 5/2011 | Thomas et al. .............. 709/231 |
| 8,095,400 B2 | 1/2012 | Herde et al. ................ 705/5 |
| 8,152,631 B2 | 4/2012 | Anderson .................... 463/25 |
| 2003/0083132 A1 | 5/2003 | Berg et al. ................. 463/40 |
| 2003/0190952 A1 | 10/2003 | Smith et al. ................ 463/30 |
| 2003/0228906 A1 | 12/2003 | Walker et al. .............. 463/40 |
| 2005/0054423 A1 | 3/2005 | Wadleigh ................... 463/20 |
| 2005/0193205 A1* | 9/2005 | Jacobs et al. ............... 713/176 |

(Continued)

*Primary Examiner* — Kyu Chae
(74) *Attorney, Agent, or Firm* — Martine Penilla Group, LLP

(57) ABSTRACT

A video generation system is configured to provide streaming video as a cloud processed service to viewers over a computing network. In response to a request from a viewer, a video source is configured to provide video and an identifier source is configured to provide an identifier for inclusion in the video. A video encoder is configured to convert the video from a first format to a second format, apply the identifier to the video, and otherwise encode the video in real-time while streaming the encoded video to the viewer. The identifier may be stored in association with the account information of the viewer and used for identifying the viewer a source of an unauthorized video copy.

17 Claims, 3 Drawing Sheets

(56) References Cited

U.S. PATENT DOCUMENTS

| | | |
|---|---|---|
| 2006/0121991 A1 | 6/2006 | Borinik et al. ............... 463/43 |
| 2006/0146057 A1 | 7/2006 | Blythe ......................... 345/506 |
| 2006/0218225 A1 | 9/2006 | Hee Voon et al. ........... 709/201 |
| 2006/0224761 A1 | 10/2006 | Howarth et al. ............. 709/231 |
| 2006/0230428 A1 | 10/2006 | Craig et al. .................. 725/133 |
| 2007/0155507 A1 | 7/2007 | Gatto et al. ................... 463/42 |
| 2007/0265094 A1 | 11/2007 | Tone et al. .................... 463/42 |
| 2008/0207322 A1 | 8/2008 | Mizrahi ......................... 463/32 |
| 2008/0234047 A1 | 9/2008 | Nguyen ......................... 463/42 |
| 2008/0284798 A1 | 11/2008 | Weybrew et al. ............. 345/630 |
| 2008/0291208 A1 | 11/2008 | Keall ............................ 345/506 |
| 2009/0118017 A1 | 5/2009 | Perlman et al. ............... 463/42 |
| 2009/0276402 A1 | 11/2009 | Stiers ............................ 707/3 |
| 2010/0167816 A1 | 7/2010 | Perlman et al. ............... 463/30 |
| 2010/0248817 A1 | 9/2010 | Anderson ...................... 463/25 |
| 2010/0317443 A1 | 12/2010 | Cook et al. ................... 463/42 |
| 2012/0004039 A1 | 1/2012 | Perry et al. .................... 463/42 |
| 2012/0004040 A1 | 1/2012 | Pereira et al. ................. 463/42 |
| 2012/0004041 A1 | 1/2012 | Pereira et al. ................. 463/42 |
| 2012/0004042 A1 | 1/2012 | Perry et al. .................... 463/42 |
| 2012/0064976 A1 | 3/2012 | Gault et al. ................... 463/42 |
| 2012/0172124 A1 | 7/2012 | Estrop et al. ................... 463/31 |
| 2012/0266198 A1* | 10/2012 | Kanojia et al. ................. 725/62 |
| 2012/0308071 A1* | 12/2012 | Ramsdell et al. ............. 382/100 |
| 2013/0034146 A1* | 2/2013 | Jeong et al. ................. 375/240.01 |

\* cited by examiner

REAL-TIME CLOUD-BASED VIDEO WATERMARKING SYSTEMS AND METHODS

This application claims priority to U.S. provisional patent application No. 61/558,859, filed on Nov. 11, 2011, which is herein incorporated by reference.

This application is also a continuation in part of U.S. patent application Ser. No. 12/791,819 entitled "Qualified Video Delivery" and filed Jun. 1, 2010; which in turn claims priority and benefit of the following provisional patent applications:

61/183,035 filed Jun. 1, 2009 and entitled "Video Server Architecture,'

61/183,037 filed Jun. 1, 2009 and entitled "Bufferless H.264 Variant,"

61/183,088 filed Jun. 2, 2009 and entitled "I/O Level Virtualization,"

61/183,546 filed Jun. 2, 2009 and entitled "Self-Spawning Video Environments,"

61/323,354 filed Apr. 12, 2010 and entitled "Artificial Frames," and

61/345,534 filed May 17, 2010 and entitled "Dynamic Video Server Including Qualifier."

This application is related to U.S. patent applications:

Ser. No. 12/790,948 filed May 31, 2010 and entitled "Bufferless H.264 Variant," and Ser. No. 12/790,995 filed May 31, 2010 and entitled "Video Execution Environments."

All of the above patent applications are hereby incorporated herein by reference.

BACKGROUND

1. Field of the Invention

The invention is in the field of video and more specifically in the field of server-side encoding copy protected video.

2. Related Art

There are several models for the delivery of streaming video. In one model previously encoded video is stored on a central server. A requested for the video it is received from a remote client and the stored video is delivered to the client. The client decodes and displays the video for a viewer. This model is commonly used when several clients may request the video. Typically, multiple copies of the video are stored, each copy being configured for a different set of client characteristics.

The previously stored video may include a watermark that uniquely identifies the video. This watermark may be configured to identify a source of the video. A wide variety of watermarking techniques are known in the art.

SUMMARY

Various embodiments of the invention include a video generation system that is configured to insert a watermark into streaming video at the same time that the streaming video is provided to a client over a computing network. In one embodiment, the computing network includes computers connected to the Internet, and such computers can include one or more servers with memory and processors that execute processing over the network to deliver a service, such as video delivery with watermarking during video streaming. Such networked systems that execute processes are sometimes referred to as cloud based systems. Thus, without limitation, it should be understood that the network processing performed to service requests from clients, such as to provide streaming video to requesting clients, can be viewed as a cloud based systems, servers, services or operations. A cloud based system can, for example, perform the processing for content that belongs on one content owner or to disparate content owners. Thus, the content can be stored in one database owned by one party, while the watermarking can be applied during downloading to clients, by the cloud based watermarking service of another party. As used herein, the word party shall be broadly defined to include any person, company, entity, division, author or owner. In one specific example, the content can include video files, and those video files may be owned or managed by a video streaming company, and delivered to customers on demand or streaming. The watermarking service can, in one example, be performed by the video streaming company by employing cloud services owned or managed by the video streaming company. In another embodiment, the watermarking service can be performed by a second company, as a service for the video streaming company. This service can be seamlessly deployed, as the watermarking service can be a cloud based system that directly communicates with the files being served by the video streaming company. In one embodiment, the video steaming company and the watermarking service can be deployed on the same infrastructure, such similar virtual machines in a data center or across various datacenters. The cloud based application of the watermarking system therefore simplifies the application of watermarking on content, on demand or as a service to any content providing service that wishes to mark the content to prevent or reduce piracy.

In some embodiments, the video is stored in a native format without a watermark and a watermark is added to the video only after a request for the video is received from the client or only after the request is anticipated to be received in a relatively short time. The watermark is optionally unique and is optionally generated in response to the request for the video from the client. When the video is delivered to the client, the watermark may be associated with information about the client and stored along with this association. The watermark is optionally inserted into the video prior to or during encoding of the video. For example, the watermark may be added to some frames of the streaming video while other frames of the streaming video are being displayed on the client. The watermark is optionally configured to uniquely identify the client and/or a user of the client.

Some embodiments of the invention include a video generation system configured to provide streaming video to viewers of computer videos over a computing network. In response to a request from a viewer (user), a video source is configured to provide video and an identifier source is configured to provide a watermark configured for addition to the video. A video encoder is configured to convert the video from a first format to a second format, apply the watermark to the video, and/or otherwise encode the video in real-time while streaming the encoded video to a client of the viewer. The watermark is optionally stored in association with account information of the viewer or client, and used for specifically identifying the viewer as a source of an unauthorized copy of the watermarked video.

Various embodiments of the invention include a video generation system comprising a request manager configured to receive a video request and a video source configured to provide video in response to the request. In these embodiments, an identifier source is configured to provide a watermark and data storage is configured to store the watermark in association with account information of a sender of the request. A video encoder is configured to convert the video from a first format to a second format, optionally add the identifier to the video, and deliver the video to the requester, all in real-time. In some embodiments, the watermark is added to a plurality of frames of the video. All or part of the watermark is optionally included in a majority of frames of the video. The watermark can be included in image and/or audio components of the video. In some embodiments, the first format has a different frame size or resolution relative to the second format.

Various embodiments of the invention include a copy protection system for providing streaming video to a viewer over a network. The system comprises a request manager configured to process a request, from the viewer, for streaming video and configured to receive an identifier for inclusion in the video as a watermark. The identifier is associated with information about the viewer. The system further includes an identifier source configured to provide the identifier. The identifier is configured such that when used as a watermark it can be used to determine that a particular video was that provided to the viewer and/or a client of the viewer. As such, the watermark can identify the viewer as a source of an unauthorized copy of the video. A database may be used to store the identifier in association with information about the viewer. A video source is configured to receive the identifier. The video source is further configured to insert the identifier into the video and/or audio as the watermark, and encode the video while providing encoded streaming video to the viewer.

The database typically includes database records configured to store identifiers, viewers, viewer clients, and/or videos. The database is configured such that information about the viewers, viewer clients, and/or videos can be retrieved using one of the identifiers. The database is stored on one or more non-volatile memory device of the system, such as a hard drive.

The system optionally includes a video library server configured to provide raw video to the video source. In various embodiments, the video source is configured to insert the identifier into the video as a watermark before, after, and/or during encoding the video. The video source may insert the identifier into an audio track of the video.

Various embodiments of the invention include a method of providing watermarked video on demand, the method comprising receiving a request for streaming video from a client, identifying a source of the video, and retrieving the video. The method further includes retrieving an identifier, inserting the retrieved identifier in the retrieved video as a watermark, and storing the identifier in association with user account information. The video may be encoded from a first format to a second format and provided to the client.

In some embodiments, the encoded video is provided only to the client that made the request and not to other display devices. In various embodiments, the retrieved identifier is inserted into the retrieved video before encoding the video, after receiving a request for streaming video from the client, or while providing the encoded video to the client. In some embodiment, the identifier is inserted into a first frame while a second frame is displayed by the client.

Various embodiments of the invention include a method for providing watermarked video on demand, the method comprising retrieving a unique watermark and associating the watermark with information about a client. The watermark and associated information may be stored. The method further includes inserting the watermark into a first frame of a video and communicating a second frame of the video including the watermark to the client while inserting the watermark into the first frame of the video. In some embodiments, communicating the second watermarked frame of the video to the client includes encoding the watermarked frame based on properties of the client and the network.

In various embodiments, the method further includes receiving a request for streaming video from a client before retrieving the watermark; identifying a source of the video based on the request; retrieving the requested video; and/or encoding the second frame of the video from a first format to a second format.

Upon detecting a watermark in a suspected unauthorized copy of a video, a stored identifier may be compared to the watermark in the suspected video. The identifier, if it matches the watermark, may be used to identify a user to whom the video was provided. The information retrieved using the identifier may further include information about the video. In some embodiments, the watermark includes information about the client. The information may be extracted from a detected watermark in an unauthorized copy of a video and used to identify the client.

DETAILED DESCRIPTION

A watermark is information added to a video that typically is not immediately apparent to a viewer of the video. The watermark can include an identifier or other data and is configured such that it is not easily removed from the video. In various embodiments of the invention, video stored on a server until requested by a particular viewer. When this request is received, a watermark is added to the stored video and the video is encoded in a specific format suitable for display on a specific client. This approach allows, for example, for a unique watermark to be added to each delivered copy of the video and/or also eliminates the need to store many versions of the video each configured for display on different types of clients. The stored video can be in a "raw" format or in a limited set of common formats. A unique watermark can be inserted into the video in response to a request for the video. The insertion optionally occurs in real time during communication of the video from the server to the viewer. The watermark can include an identifier configured to look up information about the viewer or the watermark can include the information about the viewer directly. The information about the viewer or the identifier may be subsequently extracted from a watermark detected in an unauthorized copy of the video.

Figure 1:
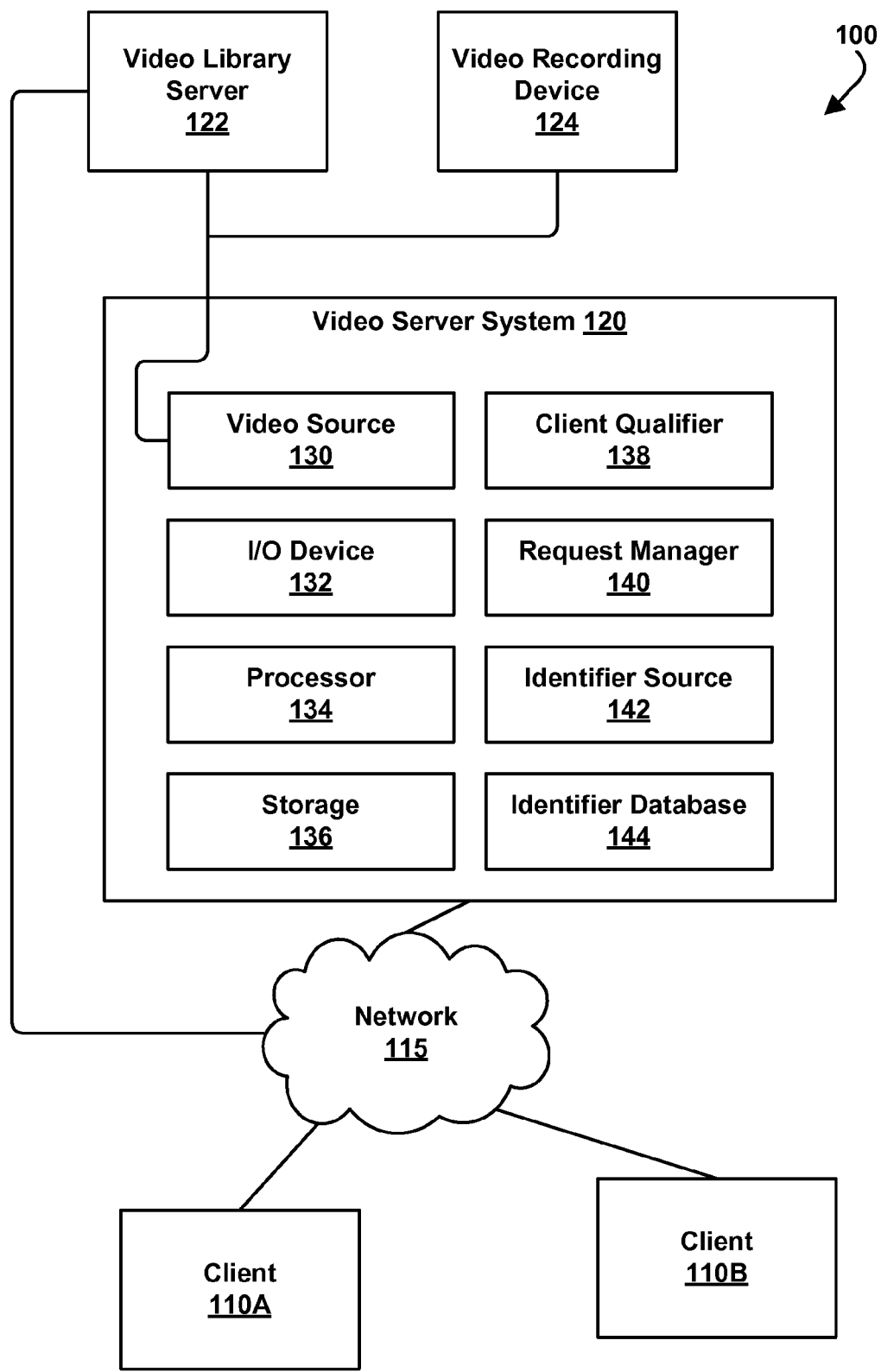
FIG. 1 is a block diagram of a video system, according to various embodiments of the invention.

FIG. 1 is a block diagram of a Video System 100, according to various embodiments of the invention. Video System 100 is configured to provide a watermarked video stream to one or more Clients 110 via a Network 115 and store information about the watermark and Clients 110. Video System 100 typically includes a Video Server System 120 and an optional Video Library Server 122. Video Server System 120 is configured to receive a request for a video from one or more members of Clients 110, retrieve the video, e.g., from Video Library Server 122, insert an identifier into the video in real time, store the identifier and information about the member of Clients 110 to which the video is delivered and/or information about a viewer using the member of Clients 110, encode the video into a video stream, and provide the encoded video stream to Client 110A or 110B.

In some embodiments, Video Server System 120 is configured to receive a command that changes a characteristic the video, such as the video's format, and to provide Client 110A or 110B with an updated video stream reflecting this change with minimal lag time. In one example, the command is a game command configured to change a game state used to render the video. In another example, the command includes information regarding video formats (encoding, frame dimensions, frame rate, etc.) that the member of Client 110A is configured to display to a viewer. In another example, the command includes a selection of a specific Video Recording Device 124.

Video Server System 120 may be configured to provide the video stream in a wide variety of alternative video formats, including formats yet to be defined. For example, Video Server System 120 may be configured to encode the video into a video stream that includes video frames configured for presentation to a user at a wide variety of frame rates. Typical frame rates are 30 frames per second, 60 frames per second, and 120 frames per second. However, higher or lower frame rates are included in alternative embodiments of the invention. Further, Video Server System 120 may be configured to encode the video into a video stream that includes video frames configured for presentation to the user of a stereo representation of three dimensional objects.

Clients 110, referred to herein individually as 110A, 110B, etc., may include viewing devices including video displays, DVD viewers, internet enabled television sets, set top boxes, internet enabled DVD viewers, terminals, personal computers, video consoles, tablet computers, telephones, kiosks, wireless devices, digital pads, stand-alone devices, handheld video playing devices, and/or the like. Typically, Clients 110 are configured to receive encoded video streams, decode the video streams, and present the resulting video to a user, e.g., a movie viewer or a viewer of a video (viewer). The processes of receiving encoded video streams and/or decoding the video streams typically includes storing individual video frames in a receive buffer of the client. The video streams may be presented to the viewer on a viewing device integral to members of Clients 110 or on a separate device such as a monitor or television. Clients 110 are optionally geographically dispersed. The number of clients included in Video System 100 may vary widely from one or two to thousands, tens of thousands, or more. As used herein, the term "viewer" is used to refer to a person that views a video and the term "viewing device" is used to refer to a device used to view the video.

Clients 110 are configured to receive video streams via Network 115. Network 115 may be any type of communication network including, a telephone network, the Internet, wireless networks, power-line networks, local area networks, wide area networks, private networks, cloud based networks and/or the like. In typical embodiments, the video streams are communicated via standard protocols, such as TCP/IP or UDP/IP. Alternatively, the video streams are communicated via proprietary standards.

A typical example of Clients 110 is a personal computer comprising a processor, non-volatile memory, a viewing device, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 110 may, but are not required to, further include systems configured for modifying received video. For example, a client may be configured to perform further rendering, to overlay one video image on another video image, to crop a video image, and/or the like. For example, Clients 110 may be configured to receive various types of video frames, such as I-frames, P-frames and B-frames, and to process these frames into images for display to a viewer. In some embodiments, a member of Clients 110 is configured to perform further rendering, shading, conversion to 3-D, or like operations on the video stream. A member of Clients 110 is optionally configured to receive more than one audio or video stream. Input devices of Clients 110 may include, for example, a remote control, wireless controller, Bluetooth control, keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 110 is generated and provided by Video Server System 120. As is described further elsewhere herein, this video stream includes video frames (and the audio stream includes audio frames). The video frames are configured (e.g., they include pixel information in an appropriate data structure) to contribute meaningfully to the images displayed to the viewer. As used herein, the term "video frames" is used to refer to frames including predominantly information that is configured to contribute to, e.g. to effect, the images shown to the viewer. Most of the teachings herein with regard to "video frames" can also be applied to "audio frames."

Clients 110 are typically configured to receive inputs from a viewer and communicate the inputs to Video Server System 120 and/or Video Library Server 122. The inputs may include account information such as account identification, password, payment information, contact information, and/or the like. These inputs may also include video selection commands configured to review a list of available videos, review a list of available video sources, and/or select a video for viewing. The inputs may further include video control commands configured to control viewing of the video, such as pause, skip, fast forward, fast reverse, slow forward, slow reverse, change frame rate, change resolution, select audio mode, display subtitle, overlay commentary, select language, select BD-Live™ features, change view, change the state of the video or otherwise affect video presentation. BD-Live is a Blue-ray feature that enables access to online content using an internet-connected Blue-ray player. BD-Live features include creation of picture-in-picture commentary, sharing of commentary with other viewers, onscreen live chats with other viewers and/or non-viewers, cast information, view new versions of the video, rate trailers and/or movies, view sneak peeks, viewing new scenes, etc. The video control and/or selection commands can be received using input devices and/or may be automatically generated by computing instructions executing on Clients 110. The received video control and/or selection commands are communicated from Clients 110 via Network 115 to Video Server System 120 and/or Video Library Server 122. For example, in some embodiments, video control commands are communicated to Video Library Server 122 via Video Server System 120. In some embodiments, separate copies of the video selection commands are communicated from Clients 110 to Video Library Server 122 and Video Server System 120. The communication of video control and/or selection commands is optionally dependent on the identity of the command. Video control and/or selection commands are optionally communicated from Client 110A through a different route or communication channel that may be used to provide audio or video streams to Client 110A.

Video Library Server 122 is configured to store one or more video. The stored videos need not include an identifier or watermark. Each of the stored videos may be stored in one or more formats. Upon receiving a request for video and an identification of the video requested, Video Server System 120 is configured to retrieve a stored video from Video Library Server 122. Video Library Server 122 may provide raw video to Video Server System 120. The raw video can be in a high resolution format and may be without any identifier or watermark. Communication between Video Server System 120 and Video Library Server 122 optionally occurs via Network 115. Video Library Server 122 may receive the video request and identification of the requested video (e.g., a movie title) from Video Server System 120 and/or directly from Clients 110. Video Server System 120 may be configured to communicate with multiple instances of Video Library Server 122 at the same time. For example, Video Server System 120 can be configured to provide a plurality of different video movies from different sources to different members of Clients 110. Each of these different video movies may be supported by a different Video Library Server 122 and/or published by different entities.

In some embodiments, several geographically distributed instances of Video Server System 120 are configured to provide video to a plurality of different members of Clients 110. A different unique identifier is optionally inserted into each of the video streams for each of the respective Clients 110. Alternatively, the same unique identifier may be inserted into the video streams for a plurality of different Clients 110. Each of these instances of Video Server System 120 may be in communication with the same or different instances of Video Library Server 122. Communication between Video Server System 120 and one or more Video Library Server 122 optionally occurs via a dedicated communication channel. For example, Video Server System 120 may be connected to Video Library Server 122 via a high bandwidth channel that is dedicated to communication between these two systems. In embodiments that include more than one instance of Video Server System 120, each instance is optionally configured such that the identifiers included in delivered video streams are unique even among all of the Video Server Systems 120.

Video Server System 120 comprises at least a Video Source 130, an I/O Device 132, a Processor 134, non-transitory Storage 136 and Identifier Source 142. Video Server System 120 may include one computing device or be distributed among a plurality of computing devices. These computing devices are optionally connected via a communications system such as a local area network.

Video Source 130 is configured to receive raw video and an identifier. Video Source 130 is further configured to add the identifier to one or more frames of the video stream as part of a watermark, encode the video, and provide a video stream of the encoded video. Examples of a video stream include streaming video and/or a series of video frames that form a moving picture.

In some embodiments, Video Source 130 receives raw video from Video Library Server 122. Video Source 130 may receive the raw video directly from Video Library Server 122 and/or via other components of Video Server System 120. In some embodiments, Video Source 130 receives raw video from a video engine and rendering logic. The video engine is optionally disposed within Video Library Server 122 and video may be generated using the video engine.

In some embodiments Video Source 130 receives raw video from a Video Recording Device 124, such as a camera. This camera may be used to generate delayed or live video that can be included in the video stream of a computer video. The resulting video stream optionally includes both rendered images and images recorded using a still or video camera. A member of Clients 110 is optionally configured to upload video to Video Source 130. Video Source 130 may also include storage devices configured to store previously recorded video, rendered video, and/or uploaded video to be included in a video stream. Optionally, the recorded video is stored in Video Library Server 122. In some embodiments, Video Source 130 receives video from multiple sources.

Video Source 130 is configured receive the identifier, configured for inclusion in a "watermark," from Identifier Source 142 and to add the identifier to the video stream in real time. For example, in some embodiments, the identifier is added to a first frame of the video stream, while a second frame of the video stream that includes the identifier is processed downstream. Downstream processing includes encoding, formatting, communicating to a Client 110, display at a Client 110, and/or the like.

The identifier may be inserted or added to every frame, or a set of frames. For example, the identifier may be added to one of 2, 3, 4, 5, 6, 10, 15, 30, 60, or more frames. The identifier may be added to the frame as image data and/or meta data attached to the frame. In some embodiments, Video Source 130 is configured to receive multiple identifiers for addition to the video stream in separate frames or in the same frame. For example, a first identifier may be added to even frames while a second identifier is added to odd frames.

The added identifier is configured to be detectable in images recorded in digital and/or analog form from Clients 110. For example, the identifier may be detectable in an image recorded using a camera pointed at a video display. In some embodiments, the added identifier is configured to be detectable in audio recorded in digital and/or analog form from Clients 110 viewing devices. Information about the receiving Client 110, a viewer, and/or the video may be embedded in the identifier. Alternatively, the identifier may be configured as an index to such information. A wide variety of methods of including a watermark in video are known in the art. Information about the video, Client, and/or viewer that is embedded in the identifier may be extracted from the identifier, or looked up using the identifier, upon detection of the identifier in the image.

Video Source 130 generates the video stream using the raw video and the identifier, optionally in real time. The video stream may be compressed or uncompressed. The video provided using Video Source 130 may be encoded according to a standard, such as an Adobe Flash® standard, .wav, H.264, H.263, H.120, H.261, H.262, On2, VP6, VC-1, WMA, Huffyuv, Lagarith, MPG-x. Xvid. FFmpeg, x264, VP6-8, realvideo, mp3, MJPEG, Motion JPEG 2000, MPEG-1, MPEG-2 (Part 2), MPEG-4 (Part 2/ASP•Part 10/AVC), HEVC, AVS, Bink, CineForm, Cinepak, Dirac, DV, Indeo, Microsoft Video 1, OMS Video, Pixlet, RealVideo, RTVideo, SheerVideo, Smacker, Sorenson Video & Sorenson Spark, Theora, VC-1, VC-2, VC-3, VP3, VP6, VP7, VP8, WMV, MPEG-1 Layer III (MP3), MPEG-1 Layer II (Multichannel), MPEG-1 Layer I, AAC, HE-AAC, MPEG Surround, MPEG-4 ALS, MPEG-4 SLS, MPEG-4 DST, MPEG-4 HVXC, MPEG-4 CELP, and/or the like. The encoding process produces a video stream that is optionally packaged for delivery to a decoder on a remote device. The encoded video stream is characterized by a frame size, a frame rate, viewing device format, and audio format. Typical frame sizes include 800×600, 1280×720 (e.g., 720 p), 1920×1080 (e.g., 1028 p) 1024×768, although any other frame sizes may be used. The frame rate is the number of video frames per second.

The encoded video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame. Audio format includes mono, stereo, quad, surround sound, language selection, Dolby variants, DTS variants, PCM, MPEG, etc. Viewing device formats include PAL, NTSC, VHS, beta, etc.

Video Library Server 122 and/or Video Source 130 may be configured to maintain information regarding format of video sent to different members of Clients 110 based on video control commands received from Clients 110. In some embodiments, Video Server System 120 maintains the format information in Identifier Database 144 and/or Storage 136. Information regarding the viewing of a video may also be stored in these locations. For example, a viewer using Client 110A may be pause or stop a movie, whereupon Video Library Server 122 and/or Video Source 130 may maintain a video state of the movie including a point where the movie is paused or stopped and the identifier used to watermark the movie. The state may be associated with Client 110A or a viewer account. A request from Client 110A to continue receiving the video may be received minutes later, hours later, days later, or after logging off and logging back on. Upon receiving a request from Client 110A to continue the video at a later time, the state may be interrogated and the video including the same identifier may begin playing from the point where it was paused or stopped. Optionally, a different identifier may be added to the continued video.

Video Source 130 is optionally configured to provide overlays configured to be placed on or under other video or images. For example, these overlays may include a command interface, login instructions, messages to a video viewer, images of other videos, split screen video, video feeds of other sources (e.g., webcam video), internet communications features such as creation of picture-in-picture commentary, sharing of commentary with other viewers, onscreen live chats with other viewers and/or non-viewers, cast information, view new versions of the video, rate trailers and/or movies, view sneak peeks, view new scenes. The identifier may be added to the overlays and/or the objects on which the overlays are placed. In embodiments of Client 110A including a touch screen interface, the overlay may include a virtual keyboard, joystick, touch pad, and/or the like. In one example of an overlay a director or actor's commentary is overlaid on an audio stream. Video Source 130 optionally further provides one or more audio sources to Clients 110.

Some videos include multiple points of view that are selectable by the viewer in real time. In embodiments wherein Video Server System 120 is configured to maintain the video state based on input from more than one viewer, each viewer may have a different point of view comprising a position and direction of view. Video Source 130 is optionally configured to provide a separate video stream for each viewer based on their point of view. Further, Video Source 130 may be configured to provide a different frame size, frame data size, and/or encoding to each of Clients 110. Video Source 130 is optionally configured to provide 3-D video. A unique identifier may be added to each separate view. Alternatively, the same identifier may be added to one or more of the related views.

I/O Device 132 is configured for Video Server System 120 to send and/or receive information such as video, audio, video overlays, video information, account information, video state, menus, advertising, search information, queue information, comments, reviews, customer support exchanges, payment processing, video selection commands, video control commands, search requests, requests for information, client identities, viewer identities, security information, logon ID-password exchange, and/or the like. I/O Device 132 typically includes communication hardware such as a network card or modem. I/O Device 132 is configured to communicate with Video Library Server 122, Video Recording Device 124, Network 115, and/or Clients 110.

Processor 134 is configured to execute logic, e.g. software, included within the various components of Video Server System 120 discussed elsewhere herein. For example, Processor 134 may be programmed with software instructions in order to perform the functions of Video Source 130, I/O Device 132, Video Library Server 122, Client Qualifier 138, Request Manager 140, Identifier Source 142 and/or Identifier Database 144. Video Server System 120 optionally includes more than one instance of Processor 134. Processor 134 may also be programmed with software instructions in order to execute commands received by Video Server System 120, or to coordinate the operation of the various elements of Video System 100 discussed herein. Processor 134 may include one or more hardware device. Processor 134 is an electronic processor.

Storage 136 includes non-transitory analog and/or digital storage devices. For example, Storage 136 may include an analog storage device configured to store video frames. Optionally, Storage 136 is also configured to store video state and/or format information. Storage 136 may include a computer readable digital storage, e.g. a hard drive, an optical drive, or solid state storage. Storage 136 is configured (e.g. by way of an appropriate data structure or file system) to store video frames, audio frames, an audio stream, identifiers, and/or the like. Storage 136 is optionally distributed among a plurality of devices. In some embodiments, Storage 136 is configured to store the software components of Video Source 130 discussed elsewhere herein. These components may be stored in a format ready to be provisioned when needed. In some embodiments, Storage 136 is configured to store contents of Identifier Database 144 discussed elsewhere herein.

Video Server System 120 optionally further comprises Client Qualifier 138. Client Qualifier 138 is configured for remotely determining the capabilities of a client, such as Clients 110A or 110B. These capabilities can include both the capabilities of Client 110A itself as well as the capabilities of one or more communication channels between Client 110A and Video Server System 120. For example, Client Qualifier 138 may be configured to test a communication channel through Network 115 and/or determine a preferred encoding for video to Client 110A.

Client Qualifier 138 can determine (e.g., discover) the capabilities of Client 110A manually or automatically. Manual determination includes communicating with a viewer of Client 110A and asking the viewer to provide capabilities. For example, in some embodiments, Client Qualifier 138 is configured to display images, text, and/or the like within a browser of Client 110A. The displayed objects request that the viewer enter information such as operating system, processor, video decoder type, type of network connection, viewing device resolution, etc. of Client 110A. The information entered by the viewer is communicated back to Client Qualifier 138.

Automatic determination may occur, for example, by execution of an agent on Client 110A and/or by sending test video to Client 110A. The agent may comprise computing instructions, such as java script, embedded in a web page or installed as an add-on. The agent is optionally provided by Client Qualifier 138. In various embodiments, the agent can find out processing power of Client 110A, decoding and display capabilities of Client 110A, lag time reliability and bandwidth of communication channels between Client 110A and Video Server System 120, a viewing device type of Client 110A, firewalls present on Client 110A, hardware of Client 110A, software executing on Client 110A, registry entries within Client 110A, and/or the like.

Client Qualifier 138 includes hardware, firmware, and/or software stored on a computer readable medium. Client Qualifier 138 is optionally disposed on a computing device separate from one or more other elements of Video Server System 120. For example, in some embodiments, Client Qualifier 138 is configured to determine the characteristics of communication channels between Clients 110 and more than one instance of Video Server System 120. In these embodiments the information discovered by Client Qualifier can be used to determine which instance of Video Server System 120 is best suited for delivery of streaming video to one of Clients 110.

Request Manager 140 is configured to handle video requests from a viewer at one of Clients 110. In some embodiments, receipt of streaming video requires that the viewer have an account and log on before requesting a video list, requesting the video, receiving the streaming video, saving a video state resulting from the viewer's controls of the video and/or continuing the video after logging off. Upon logging on, Request Manager 140 may determine an identity of viewer at one of Clients 110, e.g., Client 110A, process a video request and retrieve an identifier for the requested video.

Request Manager 140 may process a video request from the viewer. Examples of processing the video request, Request Manager 140 including providing the current video queue to the viewer, receiving a search request from the viewer, recommending videos for the viewer's consideration, providing information about videos for the viewer's review, providing reviews of videos, providing account information, receiving a video selection, and/or the like. The Request Manager may receive payment for the requested video upon selection, debit the viewer's account, store the video selection information for billing at a later time, and/or confirm that fixed periodic payments (e.g., monthly) are current. Request Manager 140 may process immediate payments using a credit card, debit card, PayPal, online funds transfer, bank transfer, and/or the like.

In response to a request, Request Manager 140 is further configured to receive an identifier from Identifier Source 142. The received identifier may be an identifier previously assigned to the logged on viewer or a new identifier. In some embodiments, an identifier is permanently assigned to a viewer upon establishing an account. Alternatively, a new identifier may be received from Identifier Source 142 each time the viewer logs into Video System 100 and/or for each video selection. In some embodiments, Request Manager 140 is configured to receive multiple identifiers.

Request Manager 140 is configured to associate the identifier and information about the viewer or a specific member of Clients 110 used by the viewer. Optionally Request Manager 140 is configured to associate the identifier and information about the selected video such as title, version, raw format, language, country code, IP address to which the video is sent, etc. Typically, Request Manager 140 is further configured store the associated information in Identifier Database 144. In some embodiments, Request Manager 140 is configured to associate and store multiple identifiers with the information about the viewer, Client 110A, and/or selected video. In various embodiments, Request Manager 140 is configured to associate additional information with the identifier for storage in Identifier Database 144 including a time stamp, a date stamp, an IP address of Client 110A, a list of video frames transmitted, viewer account information, video format information, video encoding information, video audio information, and/or the like.

Upon detection of an identifier in an unauthorized copy of a frame and/or video, the information in Identifier Database 144 may be used to determine whom the video was originally delivered to. Request Manager 140 may include one computing device or be distributed among a plurality of computing devices. These computing devices are optionally connected via a communications system such as a local area network. While Request Manager 140 is illustrated as being implemented on Video Server System 120, an instance of Request Manager 140 may be implemented alternatively or additionally on Video Library Server 122 and/or elsewhere.

If the viewer does not have an account, Request Manager 140 may establish the account automatically in communication with the viewer, e.g., via Client 110A. In some embodiments, Video Server System 120 requires an account be established prior to providing streaming video to Clients 110. In these embodiments, an instance of Request Manager 140 within Video Server System 120, or elsewhere within Video System 100, may establish a temporary account meeting the requirements of Video Library Server 122. For example, Request Manager 140 may be configured to automatically generate a viewer name, password, geographic location, and/or the like, upon receiving viewer identification, viewer address, and/or the like. This account information is then used to establish a viewing session between Video Server System 120 and Video Library Server 122. This viewing session may be used to communicate video control commands and video state information between Video Server System 120 and Video Library Server 122.

Request Manager 140 may be used by a viewer to start viewing a server based video before complete account information is provided by the viewer. For example, an identified viewer may be allowed to view trailers, preview portions of videos, and teasers before providing full account information. Additional account information may be gathered from the viewer over time, at a particular point in the video, e.g. upon completion of a preview and before continuing the video. The viewer may also be asked to pay for the video when establishing account information. A request to establish an account is optionally presented on the streaming video as an overlay or optionally elsewhere on the same browser window as the streaming video is presented. In various embodiments, viewer account information includes name, address, phone number, credit card information, debit card information, PayPal information, email address, billing address, URL, IP address, periodic billing information, payment history, type of account, viewing device format, video player model, internet service provider account, cable provider account, bandwidth, connection quality, FaceBook identification, twitter identification, and/or the like.

A virtual theater of multiple separate viewers all synchronously viewing the same move may be established. For example, a copy of the streaming video or a frame thereof, from the video a movie is provided by Video Server System 120 to the first viewer at Client 110B and information about the movie is displayed on a FaceBook® page of the first viewer. This copy of the streaming video is associated on the page with a link is configured to allow the second viewer to join the first viewer in viewing the movie. When the link is clicked by the second viewer an identifier is sent to an instance of Video Server System 120. Request Manager 140 uses this identifier and associated information to look up the first viewer, and optionally a time location within the movie, being viewed by the first viewer. Request Manager 140 uses this information to automatically generate (or suggest) account information for the second viewer that synchronizes the second viewer and the first viewer in the same movie. Request Manager 140 may also be configured to provided information to Video Library Server 122 identifying the first viewer as having referred the second viewer. Thus, the first viewer can get credit for recommending to the second viewer to join in viewing the movie. In this manner, a virtual theater multiple viewers all synchronously viewing the same move may be established. The viewers are optionally in contact over Network 115 for exchanging comments etc.

A viewer's account information optionally includes an IP (Internet Protocol) address for which Video Server System 120 stores video state information. This IP address may be different for different login sessions. For example, each time a viewer logs into view a video provided by Video Library Server 122, Video Source 130 may be provided a different IP address. Likewise Client 110A may have a different IP address for each session in which it receives streaming video from Video Source 130. In this way the IP address is associated with a viewer authenticated by the login. Likewise, when video control commands are received by Video Library Server 122, the IP address from which the commands are sent is used to assign the commands to a specific video session/viewer.

Identifier Source 142 is configured to provide an identifier configured for addition to the raw video. In some embodiments, Identifier Source 142 is configured to generate a serial, pseudo-random or random identifier absent any input. Alternatively, Identifier Source 142 may be configured to receive input information and generate a unique identifier based on the received information. In various embodiments, the received information includes viewer information, account information, the selected video, encoding information, date information, time information, Client 110A URL, location information, and/or the like. In some embodiments, the received client information is embedded into the identifier such that the client information may be extracted from a copy of a frame including the identifier. In various embodiments, the encoding information includes frame rate, frame size, frame data size, encoding standard used, audio format, viewing device format, and/or the like. In various embodiments, the location information includes location of the viewer, location of Client 110A, location of Video Library Server 122, location of Video Server System 120, and/or the like. In some embodiments, all or a portion of the received information can be determined directly from the identifier.

Identifier Database 144 is configured to store the identifier and information associated with the identifier. In some embodiments, Identifier Database 144 is configured to store multiple identifiers with associated information. In various embodiments, the associated information includes the selected video, the viewer identification, beginning time stamp, ending time stamp, beginning date stamp, ending date stamp, IP address of Client 110A, list of video frames transmitted, viewer account information, video format information, video encoding information, audio information, frame rate, frame size, frame data size, encoding standard used, audio format, viewing device format, list of video control inputs, and/or the like. Identifier Database 144 is optionally distributed among a plurality of devices. These storage devices are optionally accessible via a communications system such as a local area network or Network 115. While Identifier Database 144 is illustrated as being stored on Video Server System 120, an instance of Identifier Database 144 may be stored alternatively or additionally on Video Library Server 122. In some embodiments, Identifier Database 144 is stored in Storage 136.

Figure 2:
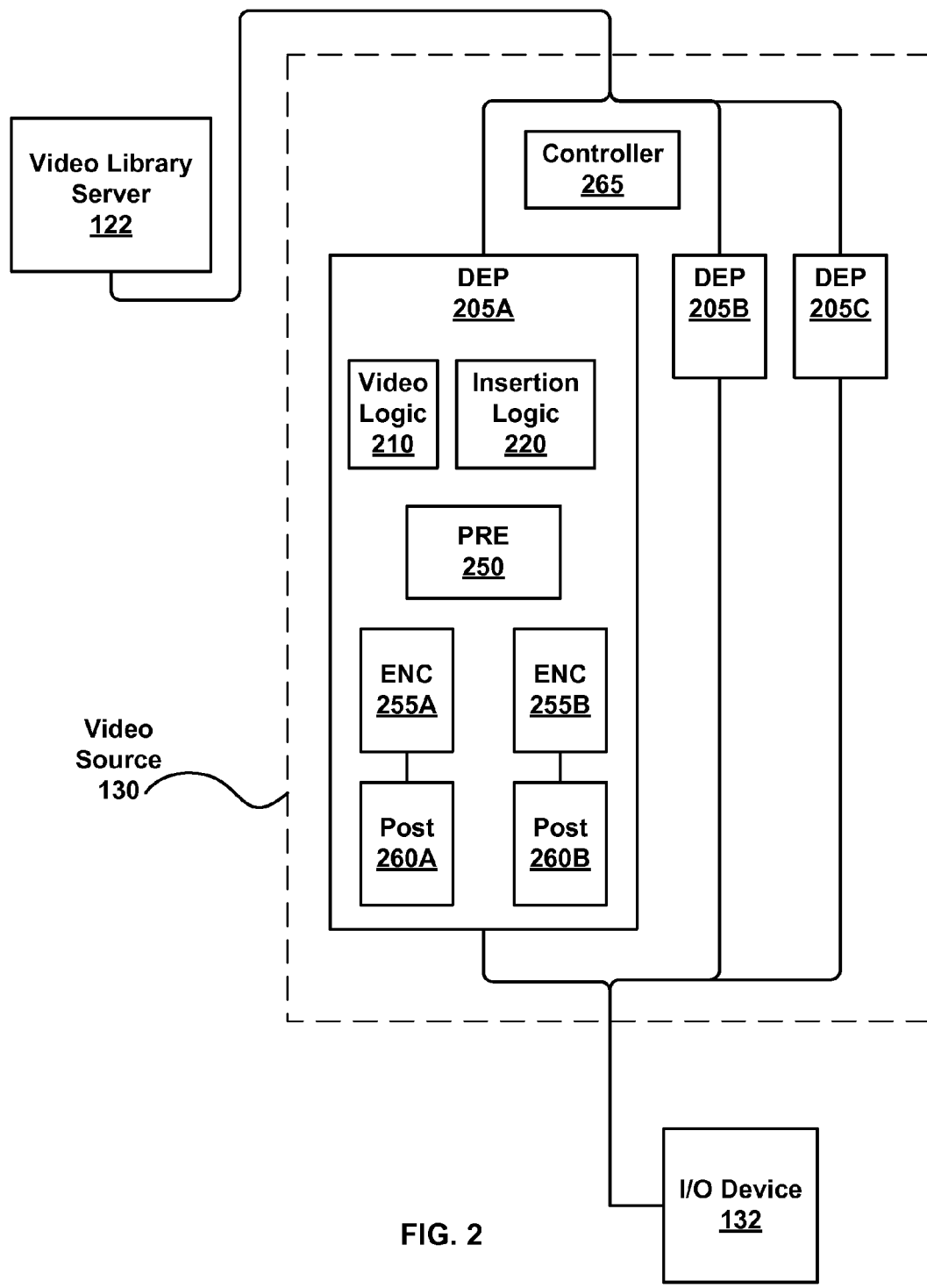
FIG. 2 is a block diagram of a video source configured to communicate watermarked streaming videos, according to various embodiments of the invention.

FIG. 2 is a block diagram of embodiments of Video Source 130 configured to serve multiple viewing devices. The multiple videos can include multiple instances of the same video and/or instances of different videos. The videos are optionally multi-viewer videos. For example, a video state of one or more of the videos may be maintained by one or more instances of Video Library Server 122 each based on video control commands received from respective Clients 110.

Video Source 130 optionally includes one or more instances of Dynamic Encoding Pipelines (DEPs) 205. The DEPs 205 of FIG. 2 are individually identified as DEP 205A, DEP 205B, DEP 205C, etc. In these embodiments, each DEP 205 may receive video data from Video Library Server 122 and/or Video Recording Device 124. Each DEP 205 is a dynamically allocated encoding pipeline that is configured to receive video data and an identifier from Identifier Source 142. Each member of DEPs 205 is further configured to encode the received video and the identifier. Each member of DEPs 205 is configured to encode the video and the identifier to video formats specified at the time the particular DEP 205 is provisioned. This format specification is typically based on the needs of one of Clients 110 and/or the capabilities of the communication path between Video Server System 120 and the member of Clients 110. DEPs 205 are optionally provisioned dynamically in response from a request from one of Clients 110. For example, when Client 110A connects to Video Server System 120 and sends a request for a video stream, DEP 205A can be provisioned to include elements, such as an encoder, selected specifically to meet needs of Client 110A. As is discussed elsewhere herein, a member of DEPs 205 is optionally configured to use more than one encoding scheme.

DEPs 205 each include one or more instance of Video Logic 210, Insertion Logic 220, optional Preprocessor (PRE) 250, Encoder (ENC) 255, and optional Post Processor (Post) 260. Video Logic 210 is configured to receive video control commands for controlling viewing of the video, from one or more of Clients 110 and to process the received commands. Video Logic 210 is optionally configured to determine the format or state of a video based on received video control commands. Typical commands include pause, skip, fast forward, fast reverse, slow forward, slow reverse, change frame rate, change resolution, select audio mode, display subtitle, overlay commentary, select language, select BD-Live features, change view, change the state of the video or otherwise affect video presentation. Video Logic 210 includes hardware, firmware, and/or software stored on a computer readable medium.

Each instance of Video Logic 210 can be disposed on a separate computing device or several instances of Video Logic 210 could be disposed on the same computing device or a single instance of Video Logic 210 could be disposed across multiple computing devices. Instances of Video Logic 210 disposed on the same computing device are optionally executed within separate virtual machines or virtual I/O shells. In some embodiments, different instances of Video Logic 210 are configured to communicate video commands and/or video state information directly to each other, e.g., without necessarily communication through Video Library Server 122.

Insertion Logic 220 is configured to receive an identifier from Identifier Source 142 and to add the identifier to the video received from Video Library Server 122 and/or Video Recording Device 124 in real time. For example, when Client 110A connects to Video Server System 120 and sends a request for a video stream, Insertion Logic 220 of DEP 205A can receive/request an identifier from Identifier Source 142. In some embodiments, Insertion Logic 220 receives multiple identifiers for addition to a video, in response to a request for a video stream. In various embodiments, Insertion Logic 220 is configured to add the identifier to the video before preprocessing, during preprocessing, after preprocessing, before encoding, during encoding, or after encoding.

Preprocessor 250 is configured to perform a color space conversion such as RGB to YUV and/or a scaling operation to increase or decrease the resolution of the video frame. Preprocessor 250 is optional in embodiments wherein the output of Video Library Server 122 or Video Recording Device 124 is in the YUV color space or some other desired color space or encoding is to take place directly from RGB color space. Multiple Preprocessors 250 may be included in a DEP 205 configured to produce multiple video streams having video frames of different sizes. Preprocessor 250 optionally includes decompression logic configured to extract uncompressed raw video frames from a compressed raw received from Video Library Server 122. Insertion Logic 220 is configured to add the identifier to the video before, during, or after preprocessing. In some embodiments, Preprocessor 250 includes Insertion Logic 220.

Encoders 255 are individually identified as Encoder 255A, Encoder 255B, etc. Each of Encoders 255 is configured to encode the video data according to a specific codec, and optionally a specific color depth and/or frame size. For example, Encoders 255 may be configured to encode video data to Adobe Flash® standard, .flv, .wav, .avi, .mpg, H.264, H.263, On2, VP6, VC-1, WMA, and/or other codecs discussed herein. In some embodiments, the Encoders 255 include Insertion Logic 220 configured to add the identifier to the video stream during encoding.

A member of DEPs 205 may include one, two or more Encoders 255. These encoders may be configured to encode to different codecs and/or the different formats of the same codec. For example. Encoder 255A may be configured to encode according to a Flash standard at a first frame size and color depth while Encoder 255B is configured to encode to the same Flash standard at a second frame size and color depth. The identity of Encoders 255 within each member of DEPs 205 is typically determined at the time the particular DEP 205 is provisioned. For example, a single command/or command set may be used to create (provision) DEP 205A and specify which components the created DEP 205A should include. The creation of DEP 205A is discussed further elsewhere herein. A member of DEPs 205 including two or more Encoders 255 is alternatively viewed as two or more separate DEPs 205 having some but not all components in common. For example, DEP 205A and DEP 205B may share the same Preprocessor 250 but different Encoders 255.

In one example, Encoder 255A is configured to use a codec for H.264 while Encoder 255B is configured to use a codec for H.263. Having two or more different encoders available enables DEP 205A to change encoding during delivery of a video stream. The change in encoding can be from one type of encoding to another, or merely a change in characteristics of a specific type of coding. For example, the characteristics may change in terms of color depth, number of frames per second, encoding options, number of pixels, and/or the like. In some embodiments, DEP 205A is optionally configured to switch between Encoder 255A and 255B in response to a change in the characteristics of Client 110A or the communication channel between Client 110A and Video Source 130.

In some embodiments, Insertion Logic 220 receives multiple identifiers and is configured to select an identifier for addition to the video stream based on the Encoder 255 in use. For example, Insertion Logic 220 may add a first identifier to the video stream while Encoder 255A is in use and add a second identifier to the video stream while Encoder 255B is in use. In some embodiments, a separate instance of Insertion Logic 220 is provisioned for each of Encoder 255A, Encoder 255B, Encoder 255C, etc.

In some embodiments, when a different codec other than that being used is required a new DEP 205 is spawned and executed in parallel with the current DEP 205 for a short period of time. The new DEP 205 is optionally a branch of the original DEP 205. For example, some components of the original DEP 205 (e.g., Insertion Logic 220) may be used in the new DEP 205. These two DEP 205 may have components logically arranged in a tree structure. In some embodiments, the same identifier is used in both the original DEP 205 and the new DEP 205. Alternatively a new identifier is received at Insertion Logic 220 of the new DEP 205.

In some embodiments, DEPs 205 are configured to use two or more different encoders to generate two or more different video streams at the same time. Insertion Logic 220 may be configured to add a unique different identifier to each video stream or add the same identifier to two or more of the video streams. These video streams are based on the same raw video received from Video Library Server 122 and, thus, include essentially the same materials (with the possible exception of overlays) and can be sent to different places. For example, one of the video streams including a first identifier can be sent to Client 110A while the other including a second identifier is sent to Client 110B. Alternatively, one of the video streams including the first identifier can be sent to Client 110A and the other including the second identifier to a website where third parties can watch the video. This website is optionally part of a social networking site or a viewer's site. The two different video streams may be different in the frame rate, encoding type, frame size, color depth, etc. For example a video stream delivered to a social networking website can be of much lower quality than the video stream delivered to a viewer who is playing a video using Client 110A. The second video stream may be directed to a viewer who is playing the video or to people who are merely observing the video play. A video stream including an identifier is optionally directed to more than one place.

Individual examples of Post Processors 260 are labeled 260A and 260B. Post Processors 260 are configured to package an encoded video frame in a container in a format appropriate for communication over a network according to a public or proprietary network protocol. For example, some protocols such as Adobe RTMP require post processing while other video standards such as H.264 Annex B do not require post processing. Each of Post Processors 260 may be associated with a specific member of Encoders 255, or several Post Processors 260 may be configured to receive encoded video frames from one member of Encoders 255. In various embodiments, the identifier is added before, during, or after Post Processor 260. Insertion Logic 220 may be included as a component of Post Processor 260. Insertion Logic 220 may be configured to add a unique identifier to for each Post Processor 260 or the same identifier to two or more of Post Processors 260.

The output of Post Processors 260 is directed to I/O Device 132 for delivery to one or more of Clients 110. The Elements of DEPs 205 discussed herein include hardware, firmware and/or software stored on a computer readable medium. For example, each of DEPs 205 may represent a set of software loaded into memory and executing using an electronic processor.

The operation of Video Source 130 is optionally managed by a Controller 265. Controller 265 includes hardware, firmware and/or software stored on a computer readable medium. For example Controller 265 may include software stored in memory and executed using a microprocessor. In some embodiments, Controller 265 is configured to provision Insertion Logic 220 in response to a request to play a video. For example, upon receiving a request for a specific video from Client 110A, Controller 265 may request one or more identifiers from Identifier Source 142 and/or Identifier Database 144 for use by Insertion Logic 220. In some embodiments, Controller 265 is configured to allocate instances of DEP 205 in response to a request to play a video. For example, Controller 265 may be configured to first determine or receive the requirements for DEP 205A and then provision computing instructions that satisfy those requirements. DEP 205A is then associated with one or more identifiers. The provisioned DEP 205A is optionally configured to retrieve raw video data from a Video Recording Device 124

In some embodiments the requirements for DEP 205A are determined by querying a viewer of Client 110A. For example, Controller 265 may be configured to cause text messages to appear on Client 110A, the messages requesting that a viewer of Client 110A enter characteristics of a video stream desired by a viewer. These characteristics can include a connection type, a frame size, an encoding scheme, a frame rate, a color depth, and/or the like. The entered characteristics are conveyed back to Controller 265, which then used these characteristics to select elements to include in DEP 205A when it is provisioned. For example, if the viewer requests a specific encoding scheme, then an Encoder 255 configured to use the requested encoding scheme is selected and included in DEP 205A.

In some embodiments the requirements for DEP 205A are determined automatically. For example, information gathered using Client Qualifier 138 in a Receive Request Step 305 and/or an Identify Source Step 310 (See FIG. 3) can be used to determine the requirements for DEP 205A. In this example, if Client 110A includes only a Microsoft Silverlight® decoder and an Adobe Flash® decoder, then at least one of the corresponding encoder configurations or variants thereof is required in DEP 205A. Characteristics of the video stream to be generated using DEP 205A, such as frame size, color depth and frame rate, can also be determined by Controller 265 in this way.

The determination of requirements for DEP 205A may include both the use of characteristics provided by a viewer and/or characteristics automatically determined. In some embodiments, the possible characteristics are limited by a viewer's account type, payment and/or subscription. For example, a viewer may be required to pay to receive a higher quality video stream.

Figure 3:
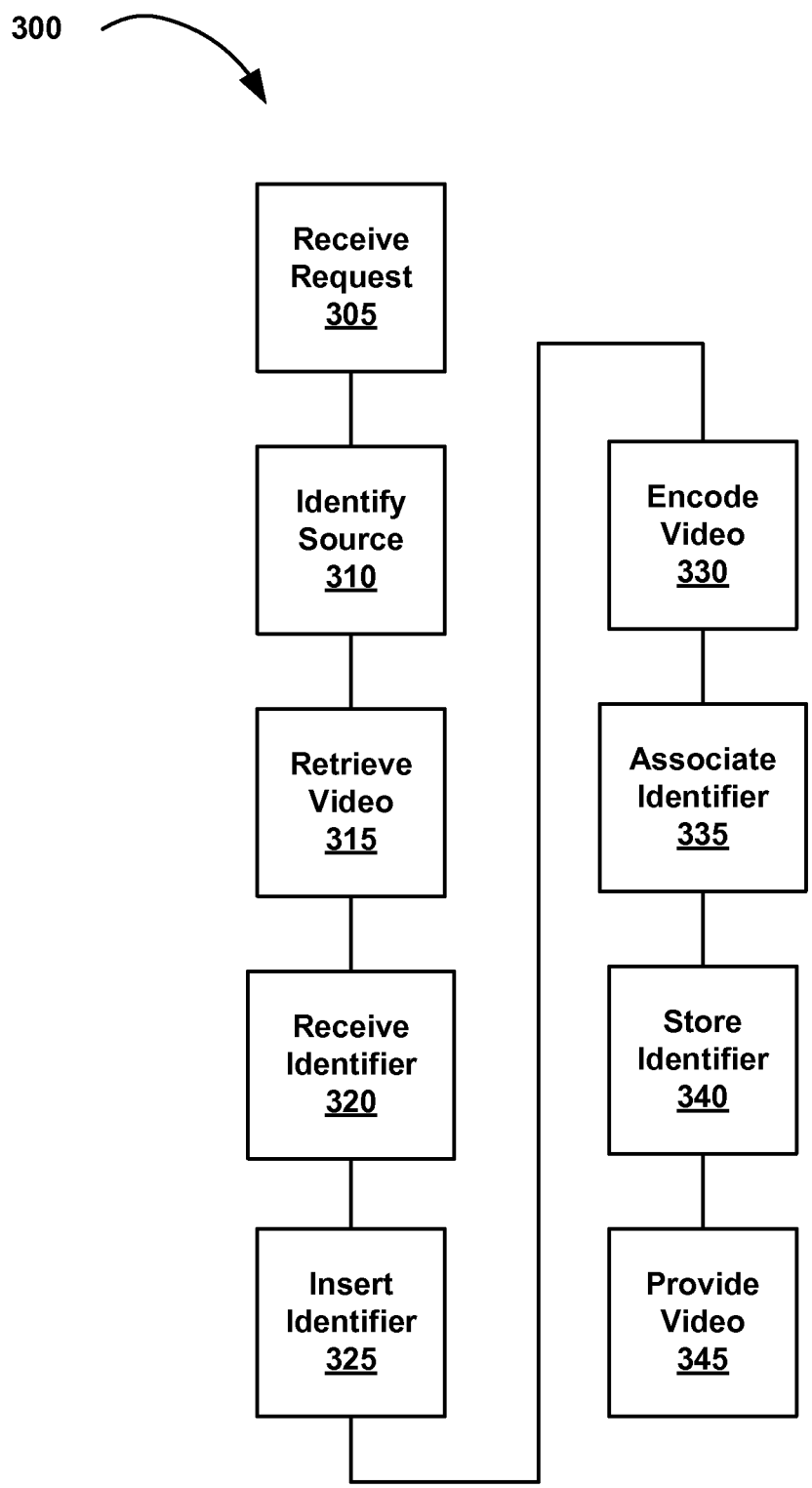
FIG. 3 illustrates a method of receiving a request for a stream and providing a watermarked video stream to a client, according to various embodiments of the invention.

FIG. 3 illustrates methods 300 of providing watermarked video streams on demand, according to various embodiments of the invention. In these methods one of Clients 110, e.g., Client 110A may be qualified to receive video, based on the identification of a viewer at Client 110A. Client 110A may request the video (e.g., stored on a Video Library Server 122). Upon receiving the request, an identifier is added to the video, as a watermark, in real time as the video is streamed to Client 110A. The identifier may be uniquely associated with Client 110A, a viewer at Client 110A, and/or the like. In some embodiments, the steps illustrated in FIG. 3 are managed by Processor 134. In Method 300, the streaming video may be received from Video Library Server 122 and provided via a Network 115. Information about the identifier may be stored along with information about Client 110A, viewer, and/or the video. The stored information may be used at some later time for detecting a source of unauthorized video copies. The steps illustrated in FIG. 3 may also be adapted to providing audio streams that are not accompanied by images. The Method 300 includes the steps of Receive Request 305, Identify Source 310, Retrieve Video 315, Receive Identifier 320, Insert Identifier 325, Encode Video 330, Associate Identifier 335, Store Identifier 340, and Provide Video 345. These steps may be performed in alternative orders.

In Receive Request Step 305, a request for streaming video is received from a member of Clients 110. The request for streaming video may be received by Video Server System 120 from Client 110A. This request and the streaming video are optionally communicated via Network 115 and I/O Device 132. In typical embodiments, the streaming video is presented to a viewer at a display of Client 110A. The content of the streaming video may be responsive to video commands entered by the viewer, and optionally viewers at other Clients 110. The video control commands may be received by Video Source 130 via Network 115 and I/O Device 132.

A viewer (user) at Client 110A and/or Client 110A may be identified before or after receiving the request. For example, the viewer may log into Video Server System 120 and/or Video Library Server 122 using a previously established ID and password before or after issuing a request. In some embodiments, Client 110A identification includes reading a cookie, IP address, MAC address, and/or other identifying information. In some embodiments, the viewer provides payment information that is associated with an account of the viewer.

In some embodiments, Video Server System 120 is configured to test capabilities of Client 110A upon receiving the request and/or login (e.g., by sending and receiving data between Client 110A and Video Server System 120). This testing may be performed by Client Qualifier 138. For example, Client Qualifier 138 may test the communication channel(s) in Network 115 using I/O Device 132. These capabilities can include both the capabilities of Client 110A itself as well as the capabilities of one or more communication channels between Client 110A and Video Server System 120. Examples of Client 110A capabilities include display size, display resolution, frame rate, color depth, display format, decoding capabilities, processing bandwidth, decoders, wired or wireless connection, and/or the like. Examples of communication channel capabilities include bandwidth, ping time, lag, jitter, reliability, and/or the like. In some embodiments more than one path between Client 110A and Video Server System 120 is tested. In some embodiments, Video Server System 120 is configured such that the request received in Receive Request Step 305 causes video and video related resources to be allocated within Video Source 130 based on Client 110A capabilities. FIG. 2 illustrates these resources within a Video Source 130, according to various embodiments of the invention. This allocation of resources may include provisioning of Video Logic 210, Insertion Logic 220 and/or dynamic provisioning of DEP 205A.

In Identify Source Step 310, a source of the requested video is identified. In various embodiments, the identification of the source of the video is based on the name of a video requested, one or more Video Library Server 122 on which the video is stored, a publisher of the video, and/or the like. In some embodiments, a video is stored on multiple Video Library Servers 122. In such case, the identification of the source of the video includes an identification of the Video Library Servers 122 selected to be the source of the video. Multiple instances of the requested video may be stored on a Video Library Server 122 and the identification of the source of the video may include an identification of a particular instance. In some embodiments, multiple substantially identical versions of a video are stored on multiple Video Library Servers 122 and/or as multiple instances on a Video Library Server 122. In some embodiments, an instance of the video is stored holographically on multiple Video Library Servers 122. Segments of the video are communicated to Video Source 130 for assembly (e.g., using Video Logic 210 and/or the Preprocessor 250). Identify Source Step 310 optionally includes selection of an instance of Video Recording Device 124 from which video is to be received.

In Retrieve Video Step 315, the video is retrieved. For example the video may be retrieved from Video Library Server 122 and/or Video Recording Device 124 and provided to Video Source 130. The retrieved video may be in a compressed or uncompressed format. The video may be streamed to Video Source 130.

In a Receive Identifier Step 320, one or more identifier is retrieved in response to the Receive Request Step 305. The identifier may be retrieved from Identifier Source 142. In some embodiments, a previously received and stored identifier is retrieved from Identifier Database 144. A new identifier may be retrieved when a state of the retrieved video changes. A single version of each video without an identifier may be stored.

In Insert Identifier Step 325, the retrieved identifier(s) are inserted into the retrieved video as a watermark. The identifier is inserted in real time as the video is received and/or delivered to the requesting member of Clients 110. Thus, the identifier may be inserted into a first frame while Client 110A displays a second frame of the streaming video. In various embodiments, the identifier is inserted before preprocessing, during preprocessing, after preprocessing, before encoding, during encoding, after encoding, before post processing, during post processing, and/or after post processing. Multiple identifiers may be inserted into the video. The identifier(s) may be inserted into each frame, or a subset of the frames.

In Encode Step 330, the video is encoded from a first format to a second format. For example, raw video may be received at Video Source 130 from Video Library Server 122 in a first format. In Video Source 130, the received video is encoded in real time into a second format. In some embodiments, a Controller 265 selects an encoder for encoding the streaming video from two or more provisioned Encoders 255 (e.g., Encoder 255A).

In Associate Identifier Step 335, the received identifier is associated with the viewer that requested the video, viewer account information, and/or an identification of the member(s) of Clients 110 to which the video is provided. Optionally, the identifier is further associated with the source of the video. In some embodiments, the identifier is associated with additional information about the viewer and/or one of Clients 110. Additional information about the viewer includes account information, name, address, phone number, credit card information, debit card information, PayPal information, email address, billing address, URL, IP address, periodic billing information, payment history, type of account, viewing device format, video player model, internet service provider, cable provider, bandwidth, connection quality, FaceBook® identification, twitter identification, and/or the like. Additional information about Clients 110 can include both the capabilities of Clients 110 itself as well as the capabilities of one or more communication channels between Client 110A and Video Server System 120

In a Store Identifier Step 340, the identifier is stored in association with viewer account information, identification of a member of Clients 110, identification of the video source, and/or the like. The identifier, user account information and source video identification may be stored in a database, such as Identifier Database 144.

In a Provide Video Step 345, the encoded video including the identifier is provided to the member of Clients 110 (e.g., Client 110A) for which the video was requested. Video Server System 120 may provide the encoded video and identifier to Client 110A via Network 115. For example, Video Source 130 may provide the encoded video and identifier to I/O Device 132 for communication to Client 110A via Network 115. In some embodiments, Video Source 130 provides encoded video including the same identifier or different unique identifiers to multiple Clients 110.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed delivery of videos via a network, the systems and methods discussed can also be applied to audio systems, or other types of cloud-based systems that deliver services/content over the network cloud.

One example includes a method of providing watermarked video on demand. The method includes retrieving a unique identifier, and associating the identifier with information about a client or a viewer. The method also includes inserting the identifier as a watermark into a first frame of a video, in response to a request for the video. The method communicates a second frame of the video including the watermark to the client while inserting the identifier into the first frame of the video. The method can also include encoding the watermarked frame based on characteristics of the client, and can include receiving the request for the video from the client before receiving the identifier. The method can identify a source of the video based on the request and can include receiving the requested video from the source. The method can include encoding the second frame of the video from a first format to a second format. Further, the method can include encoding a third frame of the video that includes the watermark while inserting the identifier into the first frame of the video. The method can further include displaying a third frame of the video at the client while inserting the identifier into the first frame of the video, the third frame of the video including the watermark. The method can still further include storing the identifier and the associated information about the client or viewer, retrieving the stored identifier and associated information about the client or viewer, and comparing the retrieved identifier and a watermark detected in a copied video.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, virtual machines, datacenters with arrays of virtual machines connected to the internet to provide services, video or audio streaming, virtual machines used by cloud based providers, virtual machines with load balancing systems to distribute load based on current demand, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein may include hardware, firmware and/or software stored on a computer readable medium. This logic may be implemented in an electronic device to produce a special purpose computing system.

What is claimed is:

1. A video generation system comprising:
   a request manager configured to receive a video request from a client and authenticate the client, the client being connected to a network of computers;
   a video source configured to provide video in response to the request;
   an identifier source configured to provide an identifier;
   a client qualifier; and
   data storage configured to store the identifier in association with information identifying the client or a user of the client;
   the video source is configured to convert the video from a first format to a second format and add the identifier to the video received from the video source in real-time while the video is being provided to the client, wherein the system is executed by one or more servers having one or more processors, the servers being connected to a network of computers and at least one of the servers connected to the network of computers including the request manager that receives the video request from the client, access the video source for the request, access the data storage and convert the video from the first format to the second format;
   wherein the video source is configured to dynamically provision an encoding pipeline in response to the request, the encoding pipeline includes an encoder that is selected based on capabilities of the client determined by the client qualifier, the client qualifier determining said capabilities in response to the request received from the request;
   wherein the video source is configured to store video state data that is indicative of one or more of a pause or a stop of the video, wherein storing of the video state enables reassigning of the identifier to the video, such that resuming from the pause or the stop restarts the addition of the identifier and the encoding by the encoder.

2. The video generation system of claim 1, wherein the identifier is unique to all delivered video.

3. The video generation system of claim 1, wherein the identifier is added to a plurality of frames of the video or a majority of frames of the video.

4. The video generation system of claim 1, wherein the first format has a different frame size or resolution relative to the second format.

5. The video generation system of claim 1, wherein the information identifying the client or the user of the client including account information having a MAC address, a credit card number or a mailing address.

6. A method of providing watermarked video on demand, the method comprising:
   receiving a request for streaming video from a client;
   qualifying the client to identify capabilities of the client;
   identifying a source of the video;
   receiving the video from the source, in response to the request;
   receiving an identifier that is unique;
   inserting the identifier in the video as a watermark, as the video is received from the source;
   encoding the video from a first format to a second format, wherein the encoding uses an encoder that is selected for the client based on the qualifying of the client;
   storing the identifier in association with user account information or information identifying the client; and
   providing the encoded video including the identifier to the client;
   wherein the identifier is inserted into the retrieved video and encoded after receiving the request from the client,
   wherein video state data is stored that is indicative of one or more of a pause or a stop of the streaming video, wherein storing of the video state enables reusing the identifier that is unique, such that resuming from the pause or the stop restarts the inserting of the identifier and the encoding by the encoder, the method being executed by a processor.

7. The method of claim 6, wherein the received identifier is inserted into a frame of the retrieved video while another frame of the video that was already encoded and includes the watermark is provided to the client, wherein the insertion and encoding is done in real-time while streaming to the client.

8. The method of claim 6, wherein the identifier includes information about the client or a user of the client.

9. A copy protection system for providing streaming video to a viewer over a network, the system including one or more servers having processors and memory, the system comprising:
   a request manager configured to process a request for streaming video from the viewer and to receive an identifier;
   a client qualifier for qualifying a client requiring streaming video;
   an identifier source configured to provide the identifier;
   a database configured to store the identifier in association with information about the viewer or the client of the viewer; and a video source configured to receive the video and the identifier, the video source further configured to insert the identifier into the video and encode the video using an encoder that is selected based on the qualifying of the client by the client qualifier, while providing the encoded video to the viewer;

wherein the video source is configured to insert the identifier into one or more frames of the video while one or more other frames of the video including the inserted identifier are transmitted to the client for viewing;

wherein the video source is configured to store video state data that is indicative of one or more of a pause or a stop of the video, wherein storing of the video state enables reuse of the identifier for the video, such that resuming from the pause or the stop restarts the insertion of the identifier and the encoding by the encoder.

10. The copy protection system of claim 9, wherein the database is further configured to store information about the video.

11. The copy protection system of claim 9, wherein the video source includes an encoder configured to encode the video and insert the identifier, wherein the encoder is one of a plurality of encoder types that are selectable based on qualification of the client by the client qualifier.

12. The copy protection system of claim 9, wherein the video source is configured to insert the identifier into an audio track of the video.

13. The copy protection system of claim 9, wherein the client qualifier is further configured to collect information about the viewer and to store this information in the database.

14. The video generation system of claim 1, wherein the client qualifier qualifies the client upon resuming from the pause or the stop and identifies for use either the selected encoder or another encoder, wherein another encoder is selected based on a change in capabilities of the client or a change in communication bandwidth or both.

15. The method of claim 6, wherein providing the encoded video including the identifier to the client is processed via a provisioned encoding pipeline that includes the selected encoder.

16. The video generation system of claim 6, wherein the qualifying is repeated upon resuming from the pause or the stop, wherein another encoder is selected based on a change in capabilities of the client or a change in communication bandwidth or both.

17. The video generation system of claim 9, wherein the client qualifier qualifies the client upon resuming from the pause or the stop and identifies for use either the selected encoder or another encoder, wherein another encoder is selected based on a change in capabilities of the client or a change in communication bandwidth or both.

* * * * *